US009398509B1

(12) United States Patent
Braun

(10) Patent No.: US 9,398,509 B1
(45) Date of Patent: Jul. 19, 2016

(54) DYNAMIC HAND-OVER PARAMETER CONTROL

(71) Applicant: Verizon Patent and Licensing Inc., Arlington, VA (US)

(72) Inventor: Barry Steven Braun, Batavia, OH (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 14/591,428

(22) Filed: Jan. 7, 2015

(51) Int. Cl.
*H04W 36/00* (2009.01)
*H04W 36/30* (2009.01)

(52) U.S. Cl.
CPC .................................... *H04W 36/30* (2013.01)

(58) Field of Classification Search
CPC ..................................................... H04W 36/30
USPC ....................................................... 455/437
See application file for complete search history.

(56) References Cited

PUBLICATIONS

New Postcom, "Short-stay and ping-pong handover issues in high-speed scenarios", R3-112445, 3GPP TSG RAN WG3 Meeting #73bis, Zhuhai, China, Oct. 10-14, 2011.*

"Evaluation of mobility issues in HetNet" 3GPP TSG RAN WG3 Meeting #74; San Francisco, USA, Nov. 14-18, 2011.
"Event A3 in LTE" www.telecomsource.net/showthread.php?5881-Event-A3-in-LTE; dated Aug. 8, 2013.
LTE; Evolved Universal Terrestrial Radio Access (E-UTRA); Radio Resource Control (RRC); Protocol specification (3GPP TS 36.331 version 8.17.0 Release 8); ETSI TS 136331; Jul. 2012.

* cited by examiner

*Primary Examiner* — Nader Bolourchi

(57) ABSTRACT

Methods and systems for dynamic parameter selection are provided. A station receives a condition measurement report from user equipment (UE) served by the station. The condition measurement report includes a signal strength indication, which includes a strength of a reference signal measured by the UE that is received by the UE over the air from the station. The wireless communication network includes a Long Term Evolution (LTE) network. A parameter controller compares the signal strength indication to a signal strength threshold, to identify a change in the strength of the reference signal. The parameter controller selects an alternate parameter value of a parameter associated with hand-over that is different from a current parameter value, responsive to the identified change in the reference signal strength. The station sends an instruction to the UE served by the station to perform hand-over measurement reporting using the selected alternate parameter value.

20 Claims, 10 Drawing Sheets

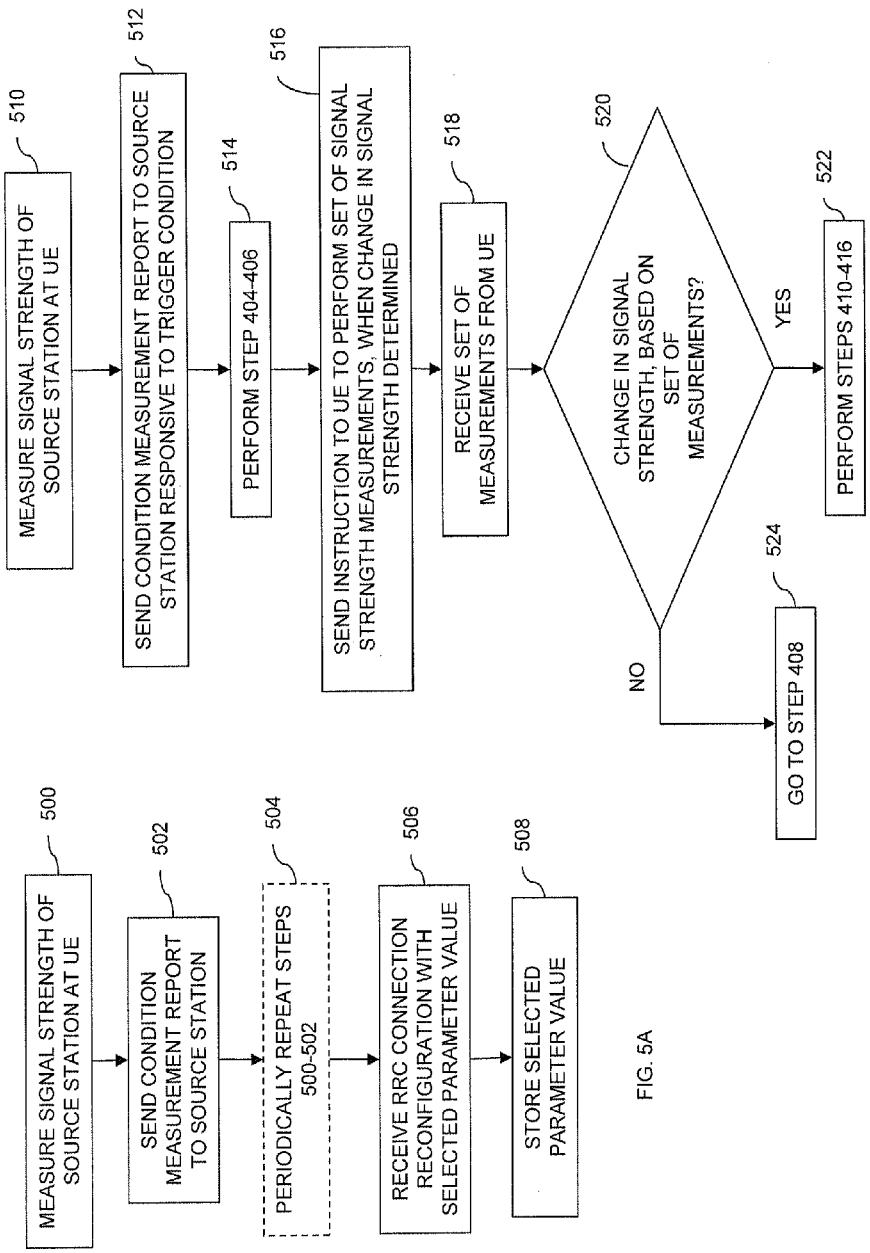

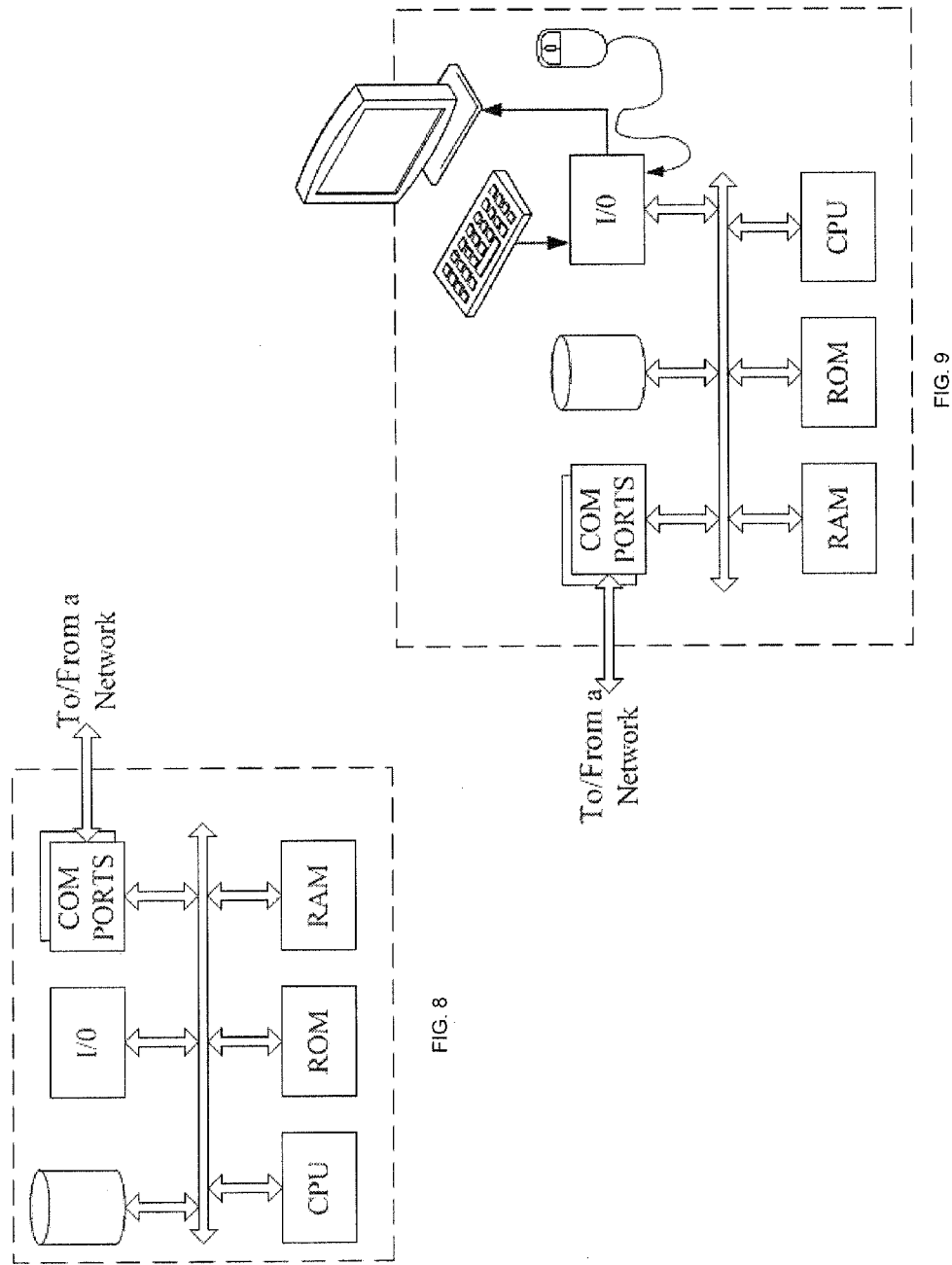

DYNAMIC HAND-OVER PARAMETER CONTROL

BACKGROUND

Consumer adoption of user equipment (UE) such as cellular telephones, laptop computers, pagers, personal digital assistants, and the like, is increasing. These devices can be used in a wireless communication network for a diversity of purposes ranging from basic communications, to conducting business transactions, to managing entertainment media, as well as a host of other tasks.

A wireless communication network may include a number of stations associated with a respective number of geographical areas (also referred to herein as cells) that can support communication coverage for a number of UEs. A UE can travel through the network from a source cell to a neighboring cell on a single-cell network connection basis. As the UE migrates through the network, the existing connection to the network via the source cell is released, and a new connection to the network is re-established on the neighboring cell. This process is known as hand-over.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 5A is a flow chart diagram illustrating an example of condition measurement report transmission and parameter value storage at a UE.

FIG. 5B is a flow chart diagram illustrating an additional example of dynamic parameter control.

FIG. 8 is a simplified functional block diagram of a computer that may be configured as a host or server, for example, to function as the dynamic parameter controller in the system of FIG. 1.

FIG. 9 is a simplified functional block diagram of a personal computer or other work station or terminal device.

DETAILED DESCRIPTION OF EXAMPLES

Figure 1:
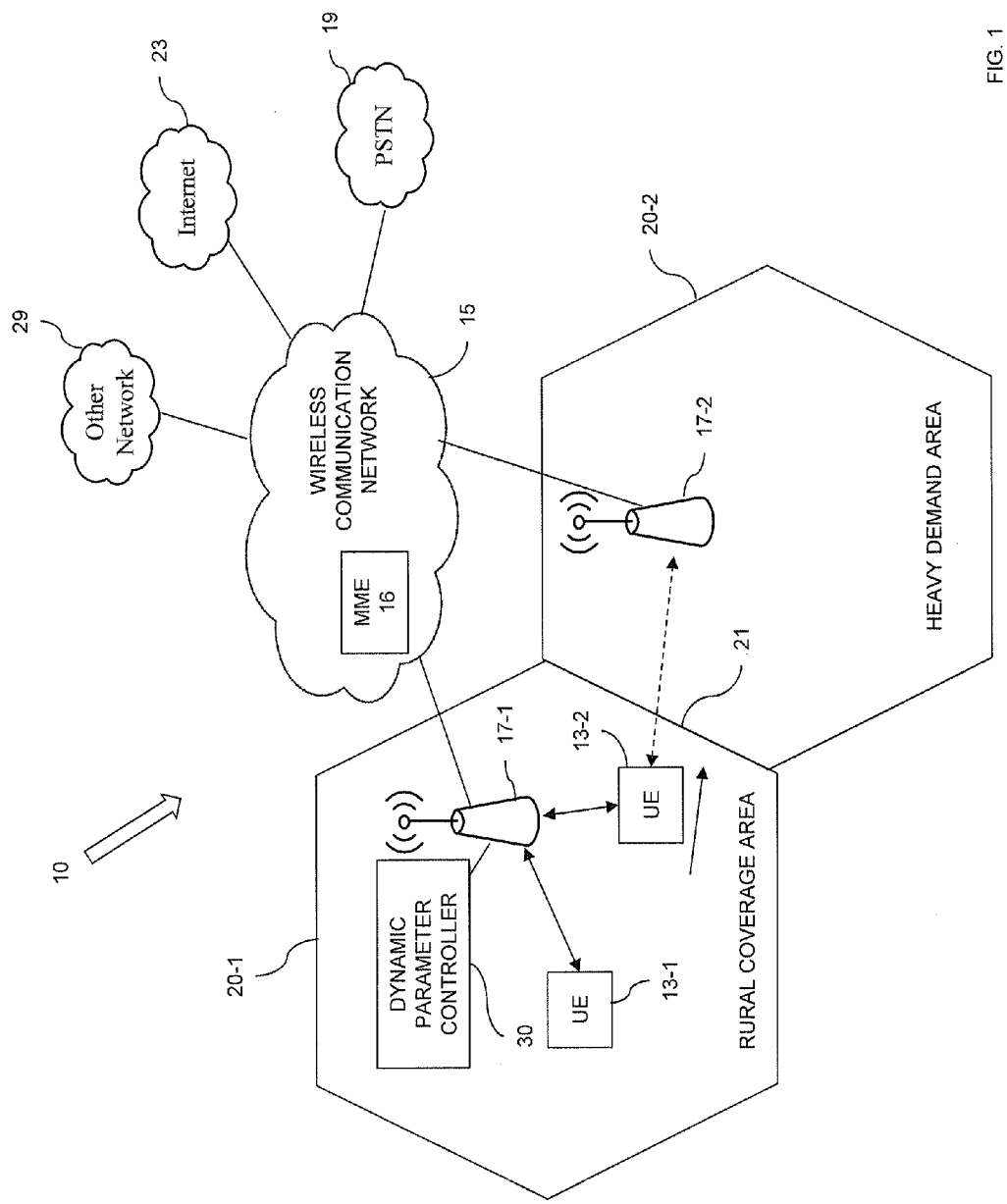
FIG. 1 is a high-level functional block diagram of an example of a system that supports an example of a dynamic parameter control service.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

In a Long Term Evolution (LTE) network, a UE detects suitable neighbor cells for hand-over with and sometimes without the assistance of a list of neighbor cells. The UE detects suitable hand-over candidates, and a hand-over evaluation is performed by the serving station. The UE uses parameters sent by the serving station to determine when to perform hand-over measurements. The UE monitors the serving cell's coverage and determines the health of its radio link through a reference signal strength. The reference signal strength (such as a Reference Signal Receive Power (RSRP), typically measured in decibels (dBs)) is applied to the messaging to and from the station to express the condition of the radio link.

An example of hand-over for a UE that originates a call in a coverage area of cell A is described. As the UE leaves the coverage of cell A and enters the coverage area of neighboring cell B, the RSRP of cell A becomes weaker, and the RSRP of cell B becomes stronger. Eventually, the RSRP of cell B becomes stronger than cell A; as cell B signal becomes strong enough to interfere with the existing connection that the UE has with cell A. At this point, the condition of the radio link between the UE and the system is degraded, and handing the connection over to (the stronger) cell B becomes desirable to maintain a healthy radio link with the network.

When the UE detects a stronger neighbor and the desirability of a hand-over, the UE sends a measurement report message to the system about the condition. The UE sends a report message containing the signal strength of both the serving cell RSRP and the hand-over candidate cell RSRP. (The UE may periodically scan its own serving cell RSRP, as well as all other RSRP cells in the neighboring system and typically reports the strongest values.) The system evaluates the measurement report message and determines if the conditions are right for a hand-over. When the hand-over conditions are met, the system initiates the hand-over. Measurement condition values, including a measurement offset value and a measurement hysteresis value, may collectively determine if the hand-over condition is met in order to initiate the hand-over.

The level of hysteresis (or difference in strength of received signals, between a hand-over candidate and a current serving station) in which the hand-over initiation determination is made can be set by one or more dynamically controlled parameters that the network communicates to the UE. In LTE, the event A3 is defined as a triggering event when conditions are right for hand-over initiation. An LTE example may use the event A3 parameters "A3-offset" and "A3-Hysteresis," which are represented in decibels (dB).

The need for initiating a hand-over to rectify the difference in strength between the serving cell and the better (but interfering) candidate cell can be referred to as "hysteresis". The hysteresis value is the predetermined difference (in dB) between the serving cell and the neighboring cell that has to be reached before a hand-over is initiated. For example if the system hysteresis value is 6 dB, and a UE has a serving cell RSRP value of −80 dBm, a measurement report message will not be sent back to the system and a hand-over will not be initiated until a neighboring cell's RSRP is received and qualifies for hand-over at −74 dBm.

The measurement offset value (also referred to as bias value or sometimes the A3 offset value) is a value applied to a serving cell or an adjacent neighbor cell to encourage or retard the hand-over in one way or another. For example, if the neighboring cell has an offset (bias) value of −2 dB, the UE will apply that bias value to the hand-over initiation criteria to advance or retard the hand-over. For example, if a serving cell has an RSRP of −80 dBm, and a hand-over hysteresis of 6 dB, a neighbor cell with a hand-over bias of −2 dB has an RSRP of −72 dBm before the hand-over is initiated by the system. Hand-over qualification (also referred to as event A3 in the LTE standard) may be described by the equation: Event A3=Serving Cell RSRP measurement+Hysteresis+Serving Cell Offset<Neighbor Cell RSRP measurement+Neighbor Cell Offset. The event A3 is described further below with respect to FIG. 6A.

Currently, the hysteresis parameter and offset (bias) parameter(s) for initiating hand-over measurement are fixed values. The likelihood of hand-over is directly proportional to the selected value for the hysteresis parameter and the offset parameter.

A large value (for the hysteresis and/or offset) discourages hand-overs, while a low value increases the frequency of hand-overs. In practice, a wireless network operator determines a "balanced" fixed value that is large enough to control the number of hand-over attempts and manage capacity, and small enough to allow hand-overs to occur easily enough for a smooth transition from cell to cell.

Intentional handoff reluctance created by large hysteresis and offset values is an effective capacity management technique as it helps to keep demand away from capacity-strapped cells in busy environments. (For example, UEs are discouraged from handing to busy cells and adding to the capacity problem). However, this large value may create a problematic hand-over environment, with poor performance, for weak signal strength areas (e.g. by encouraging a UE device to stay with a weak-signal capacity strapped cell even when a cell providing a stronger signal is detected).

When the hysteresis is a fixed small value, hand-offs are encouraged. The performance with a small value may be tolerable in low signal strength environments (because hand-over can occur more frequently), but capacity may not be well managed in strong signal strength environments (because UEs are likely to jump to the capacity-strapped cell). There is also a problem of frequent messaging, which places a strain on system resources as well has a higher probability of dropping the connection under frequent hand-over conditions.

Today, there is no existing solution for selecting the hysteresis and offset values that takes into consideration different, possibly variable, signal strength environments, without an operator.

As discussed above, currently, the hysteresis and offset values are fixed. Reduced hysteresis values make hand-overs easier and create an increase in hand-over attempts. If UE hand-overs are made difficult with large hysteresis values, the number of hand-overs attempts decrease. Sometimes operators use a larger hysteresis value to discourage hand-overs into busy (overloaded) sectors in an effort to improve capacity and cell efficiency of the network. If the hysteresis and offset values are too high, the UE suffers a great amount of interference from the hand-over candidate before the hand-over is made. Therefore, performance may suffer in the effort to improve capacity. If the hysteresis and offset values are too small, the UE makes the hand-over too early. Thus, slight changes in the received signal strength could make the UE attempt to hand back to the previous cell. If system conditions cause serving and neighbor cells RSRP values to fluctuate slightly, the end result could be a Ping-Pong effect as the UE hands back and forth between competing cells. Currently, the wireless network operator determines a "balanced" fixed value that is large enough to control the number of hand-over attempts and manage capacity, and small enough to allow hand-overs to occur easily enough for a smooth transition from cell to cell.

The various methods and systems disclosed herein relate to dynamic parameter selection methods and dynamic parameter control systems. The parameter is a parameter associated with hand-over in a wireless communication network including an LTE network. A station in the wireless communication network, such as the eNodeB in an LTE network, receives a condition measurement report from a UE device served by the station. The condition measurement report includes a signal strength indication of the station. The signal strength indication represents a strength of a reference signal measured by the UE, that is received by the UE over the air from the station. A parameter controller in the network compares the signal strength indication of the station to a signal strength threshold, to identify a change in the strength of the reference signal (received from the station by the UE). The parameter controller selects an alternate parameter value different from a current parameter value, responsive to the identified change in the strength of the reference signal. The station sends an instruction to the UE served by the station to perform hand-over measurement reporting using the selected alternate parameter value. The parameter controller is associated with the station (i.e., as an internal component of the station or an external component in the network that is communicatively coupled to the station). The parameter associated with hand-over may include a hysteresis and/or an offset, as well as any other suitable parameter associated hand-over. Thus, in some examples, the parameter controller may select two or more alternate parameter values associated with two or more parameters (e.g., hysteresis and offset).

The source station is a station that serves the UE, to establish and maintain a connection between the UE and the wireless communication network. The connection may be an active connection, where data is exchanged between the UE and the network. The connection may also be an idle connection, in which no data is exchanged.

In some examples, the parameter value may be used for hand-over measurement reporting. In some examples, the parameter value may also be used for actual initiation of hand-over to a target station (i.e., a station not currently serving the UE). As described further below with respect to FIGS. 3 and 6A, hand-over measurement reporting is typically the first step in hand-over processing, and involves a comparison of source and target station signal strengths. The condition measurement report(s) is used to communicate changes in reference signal strength of the source (i.e., serving) station (as measured by the UE), in order to vary the parameter value (for hand-over measurement reporting and/or hand-over initiation) based on the radio link health of the source station.

In some examples, a first parameter value is selected when the signal strength indication is greater than the signal strength threshold. A second parameter value that is less than the first parameter value is selected when the signal strength indication is less than or equal to the signal strength threshold. The first parameter value is selected to reduce a hand-over likelihood in radio frequency (RF) conditions of the station higher than the signal strength threshold (i.e., better RF conditions). The second parameter value is selected to increase the hand-over likelihood in RF conditions of the station lower than the predetermined threshold (i.e., poor RF conditions). In some examples, multiple condition measurement reports are used to identify the change in a reference signal strength of the station. In some examples, the alternate parameter value is selected by comparing the signal strength indication to one or more signal strength thresholds. In some examples, a condition measurement report is sent from the UE to the station responsive to a predetermined trigger condition.

Reference now is made in detail to the examples illustrated in the accompanying drawings and discussed below. FIG. 1 is a high-level functional block diagram of an example of a system of networks/devices that provides various communications for UEs and supports an example of the dynamic parameter control service. The system 10 (also referred to as network 10) includes a number of stations (referred to collectively herein as "stations 17" and individually as "station 17"), a wireless communication network 15 and other network entities (for example, public switched telephone network (PSTN) 19, Internet 23, other network 29, and the like). A dynamic parameter controller 30 (also referred to herein as controller 30) is communicatively coupled to station 17-1. Controller 30 adjusts a parameter associated with hand-over measurement reporting (e.g., trigger event initiation such as event A3) based on a reference signal strength identified by a UE (e.g., UE 13-1 or 13-2) in a condition measurement report (described further below with respect to FIG. 3). Although not shown, an additional controller 30 may also be communicatively coupled to station 17-2. In some examples, controller 30 is separate from (i.e., external to) station 17. For example, controller 30 may be located on a server (outside of cell 20-1, such as in network 15) that is communicatively coupled to station 17. In other examples, controller 30 may be part of (i.e., internal to) station 17. In some examples, controller 30 may be part of mobility management entity (MME) 16.

The present techniques may be implemented in any of a variety of available wireless networks 15 and/or on any type of UE (referred to collectively herein as "UEs 13" and individually as "UE 13") compatible with such a network 15, and the drawing shows only a very simplified example of a few relevant elements of network 15 for purposes of discussion herein. Network 10 provides communications between UEs 13 as well as communications for UEs 13 within networks and devices outside wireless communication network 15.

Network 15 allows users of UEs 13 (and other mobile devices not shown) to initiate and receive telephone calls to each other as well as through PSTN 19. Network 15 also typically offers a variety of data services via Internet 23, such as downloads, web browsing, email, etc. The carrier also operates a number of systems that provide ancillary functions in support of the communications services and/or application services provided through network 10, and those elements may communicate with other nodes or elements of network 10 via one or more private IP type packet data networks 29 (sometimes referred to as an Intranet), i.e., a private network.

Wireless communication network 15 (i.e., a cellular network) might be implemented as a network conforming to the $3^{rd}$ Generation Partnership Project (3GPP) LTE standard. UEs 13 are capable of wireless communications through network 15.

Stations 17 in the examples described below are evolved node Bs (eNodeBs or eNBs), and stations 17 and wireless communication network 15 operate according to the LTE standard. Each station 17 is communicatively coupled to wireless network 15 and provides wireless communications to UEs 13. Network 15 includes a mobility management entity (MME) 16 that processes signaling between UEs 13 and network 15 (via stations 17 in cells 20) managed by MME 16. Station 17 facilitates the establishment of a communication session for UEs 13 by forwarding control signals to MME 16. MME 16 may activate and deactivate bearer channels such as radio channels over the air and/or data network bearers. A bearer is a logical channel having particular service requirements. For example, the bearer may be a radio bearer between UE 13-1 and station 17-1. The bearer may also be a data bearer between station 17-1 and a serving gateway (SGW) in network 15 or a data bearer between gateways in network 15. The MME 16 may also authenticate UEs 13, and may interface with non-LTE radio access networks. In some examples, network 15 includes an evolved packet core (EPC), including additional components (not shown), such as an SGW and a packet data network (PDN) Gateway.

Each station 17 may provide communication coverage (i.e., communication services) for a particular geographic area (referred to collectively herein as "geographical areas 20" and individually as "geographical area 20", also referred to as a "cell"), which may be a macro cell, a pico cell, a femto cell, and/or other types of cell. In the example shown in FIG. 1, station 17-1 provides communication coverage for geographic coverage area 20-1 and station 17-2 provides communication coverage for geographic coverage area 20-2. In FIG. 1, cell 20-1 represents a rural coverage area and cell 20-2 represents a heavy demand area. Cells 20-1 and 20-2 are separated by border 21.

For example, station 17-1 communicates with UEs 13-1 and 13-2 for coverage area 20-1. Although not shown, station 17-2 communicates with any UEs for coverage area 20-2. In FIG. 1, a solid line indicates desired transmissions between a UE 13 and a serving station 17, (i.e., a station designated to serve the UE). A dashed line indicates interfering transmissions between a UE and a station (such as between station 17-2 and UE 13-2). A UE 13 may communicate with more than one station 17 if cells 20 of stations 17 overlap. It is understood that the number of UEs 13, the number of stations 17, the number of cells 20 and/or networks illustrated in FIG. 1 is provided for explanatory purposes only. In practice, there may be additional devices and/or networks, fewer devices and/or networks, different devices and/or networks, or differently arranged devices and/or networks than illustrated in FIG. 1.

Each UE 13 may be stationary or mobile. A UE 13 may also be referred to as a terminal, a mobile station, a subscriber unit, a station, or the like. A UE 13 may be a cellular phone, a personal digital assistant (PDA), a wireless modem, a wireless communication device, a handheld device, a laptop computer, a personal computer (PC), a cordless phone, a tablet, or the like. In FIG. 1, UE 13-1 represents a device (mobile or stationary) that is within cell 20-1 and experiences minimal interference from station 17-2. UE 13-2 represents a mobile device that is roaming from cell 20-1 towards cell 20-2, and experiences some interference from cell 20-2.

Dynamic parameter controller 30 monitors a signal strength indication(s) from reference signal strength measurement(s) of the source station (such as station 17-1) determined by a UE (such as UE 13-2) (described below with respect to FIGS. 3 and 4). The reference signal strength measurement(s) are sent from UE 13 (e.g., UE 13-2) in one or more signal strength condition measurement reports (also referred to herein as condition measurement reports) as a signal strength indication(s). The signal strength indication represents a measured strength (such as an RSRP level) of a reference signal received (and measured) by the UE 13 (e.g., UE 13-2) that is sent over the air from source station 17-1. Controller 30 compares the signal strength indication of station 17-1 to a signal strength threshold, to determine whether a parameter associated with hand-over should be changed from a current value to a different value (e.g., from a first value to a second predetermined value). When it is determined that the parameter should be adjusted, controller 30 instructs the UE 13 that sent the condition measurement report (e.g., UE 13-2), to set the parameter to the newly selected predetermined value (described further below with respect to FIG. 4). Dynamic parameter controller 30 is described further below with respect to FIG. 2.

Figure 2:
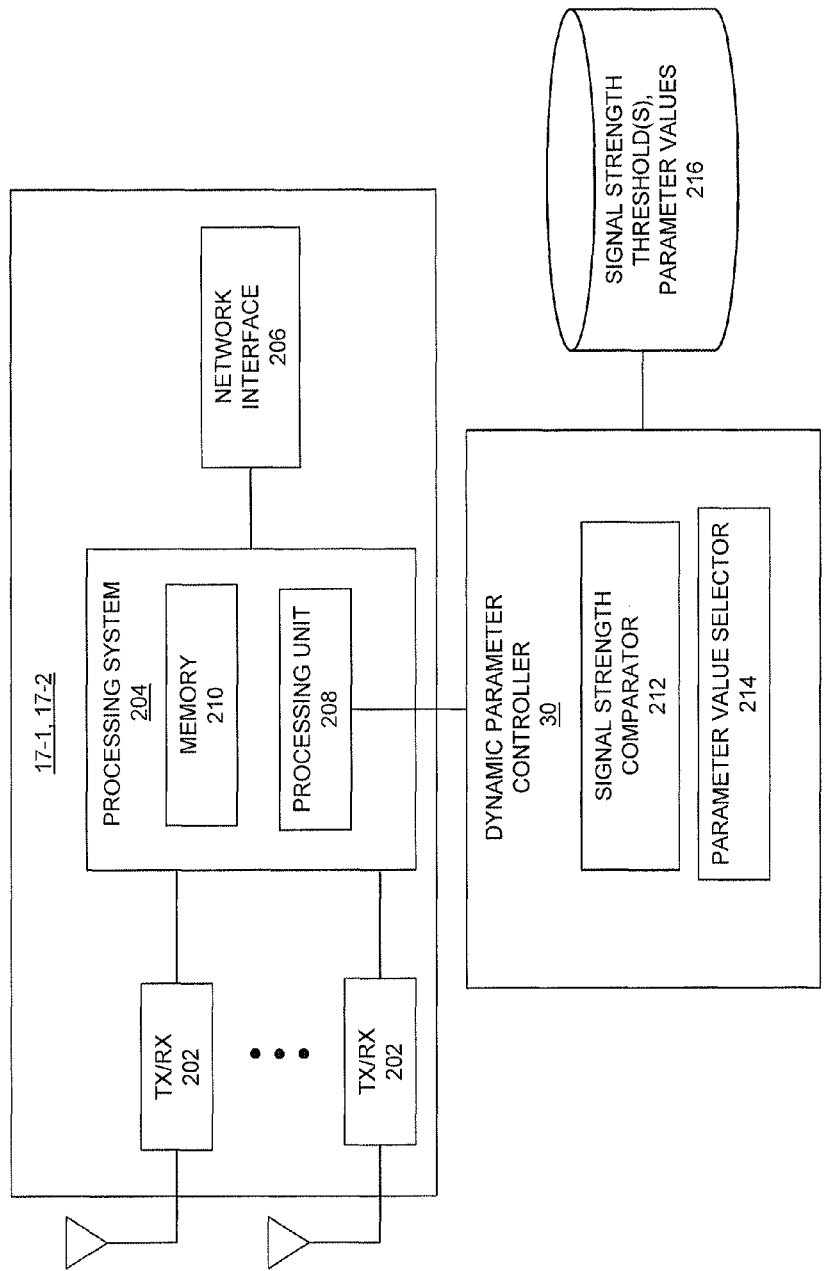
FIG. 2 is a high-level functional block diagram of an example of a station and dynamic parameter controller shown in FIG. 1.

FIG. 2 is a diagram of example functional components of station 17 and dynamic parameter controller 30. Station 17 includes transceivers 202, processing system 204 and network interface 206 for communication with network 15 (FIG. 1). Processing system 204 may control the operation of station 17. Processing system 204 includes processing unit 208 and memory 210. Controller 30 determines whether to adjust a parameter associated with hand-over for a specific UE 13 (such as UE 13-2), based on a reference signal strength of station 17 as measured by the corresponding UE 13 (e.g., UE 13-2). Controller 30 selects an alternate value and indicates to processing unit 208 to change to the alternate value. Responsive to the indication from controller 30, processing system 204 instructs the corresponding UE 13 (e.g., UE 13-2) (via transceivers 202) to initiate hand-over measurement reports using the alternate value. Processing system 204 sends the instructions as a radio resource control (RRC) connection reconfiguration message to the UE 13-2.

Processing unit 208 of station 17 includes one or more processors, microprocessors, application specific circuits (ASICs), field programmable gate arrays (FPGAs), or the like. Processing unit 208 processes information received via transceivers 202 and network interface 206. The processing may include, for example, data conversion, forward error correction (FEC), rate adaptation, Wideband Code Division Multiple Access (WCDMA), spreading/despreading, quadrature phase shift keying (QPSK) modulation, etc. In addition, processing unit 208 may transmit control messages and/or data messages, and cause those control messages and/or data messages to be transmitted via transceivers 202 and/or network interface 206. Processing unit 208 may also process control messages and/or data messages received from transceivers 202 and/or network interface 206.

Example memory 210 includes a random access memory (RAM), a read-only memory (ROM) and/or another type of non-transitory memory to store data and instructions that may be used by processing unit 208. In some examples, memory 210 stores predetermined signal strength conditions that are used by controller 30 to determine whether to adjust the parameter (examples of which are described further below with respect to FIGS. 5A-5C).

In FIG. 2, processing unit 208 is illustrated as being communicatively coupled to controller 30. In some examples, controller 30 may be located on a server (not shown in the network 10). In some examples, controller 30 may be a separate component internal to station 17. In some examples, processing system 204 is configured to perform at least some or all of the processing performed by controller 30.

Dynamic parameter controller 30 may include signal strength comparator 212 and parameter value selector 214. Dynamic parameter controller 30 is also communicatively coupled to database 216 that stores predetermined signal strength conditions, such as predetermined signal strength thresholds and predetermined parameter values. In some examples, database 216 may be located in network 10. In other examples, database 216 may be located internal to station 17. As discussed above, in some examples, memory 210 may also store one or more predetermined signal strength thresholds and/or predetermined parameter values. The predetermined parameter values may be associated with any parameter associated with hand-over including, but not limited to, at least one of hysteresis or offset. In some examples, database 216 and/or memory 210 stores additional information such as predetermined trigger condition(s), a predetermined report interval and/or a predetermined number of condition measurement reports to generate. This additional information may be included in an instruction to a UE 13 (e.g., UE 13-2), in order for the UE 13 to generate condition measurement reports.

In some examples, different signal strength thresholds and/or parameter values may be assigned to different UEs 13 served by cell 20 (e.g., cell 20-1). In some examples, all UEs 13 served by the same cell 20 may have the same signal strength threshold(s) and/or parameter values. In some examples, different cells may be associated with different signal strength thresholds and/or parameter values. For example, rural cell 20-1 may be associated with a first (higher) signal strength threshold and/or parameter values, whereas heavy demand cell 20-2 may be associated with a second (lower) signal strength threshold and/or parameter values. In other examples, all cells 20 in network 10 may have the same signal strength threshold(s) and/or parameter values.

Signal strength comparator 212 obtains signal strength indication(s) from one or more condition measurement reports sent by a UE 13, via processing system 204. Signal strength comparator 212 compares the signal strength indication (e.g., RSRP level) with one or more predetermined signal strength thresholds stored in database 216, to identify a change in reference signal strength of station 17 (as measured by UE 13). The change in reference signal strength is used determine whether an alternate predetermined parameter value (different from the current parameter value) should be selected.

Parameter value selector 214 receives the signal strength indication from signal strength comparator 212 and selects an alternate parameter value for hand-over processing. Parameter value selector 214 sends an indication of the selected parameter value to processing unit 208 of processing system 204. Processing unit 208 sends an instruction to the UE 13 that sent the condition measurement report (e.g., UE 13-2), via transceivers 202, to use the newly selected parameter value for hand-over measurement report generation. The instruction may be sent to the UE 13 as an RRC connection reconfiguration message. The example illustrates changing a parameter value for one parameter (e.g., hysteresis or offset) based on the signal strength indication. In some examples, a parameter value for each of multiple parameters associated with hand-over (e.g., hysteresis and offset) may be altered based on the signal strength.

As discussed above, dynamic parameter controller 30 relies on reference signal strength information of station 17 as captured by the UE 13, to identify a change in the reference signal strength of station 17 and adjust the parameter value. Next, a brief description of LTE hand-over initiation (e.g., event A3) and its relationship to the hand-over measurement parameters (including hysteresis and offset parameters) is provided, prior to describing example dynamic parameter value adjustment by controller 30. In the description below, station 17-1 represents a source station, station 17-2 represents a target station, and UE 13-2 represents the UE that performs hand-over measurements and communicates with source station 17-1. Although the signal strength measurement is described in terms of RSRP level, UE 13-2 may also measure a reference signal receive quality (RSRQ) level for the event procedure.

In an LTE network (such as network 15), UE 13-2 uses parameters sent by source station 17-1 to determine when to perform hand-over measurements. UE 13-2 performs hand-over measurements on source station 17-1 and neighboring stations (such as target station 17-2). The hand-over measurements by UE 13-2 begin when the signal strength (e.g., RSRP level) of source station 17-1 becomes less than a predetermined value (typically referred to as an sMeasure parameter). UE 13-2 detects neighboring stations 17 via intra frequency searches.

As discussed above, in an LTE network, the event A3 is defined as a triggering event for hand-over initiation. The event A3 is triggered when the RSRP level of a neighbor station (e.g., target station 17-2) becomes greater than source station 17-1 by a predetermined bias value.

Figure 6A:
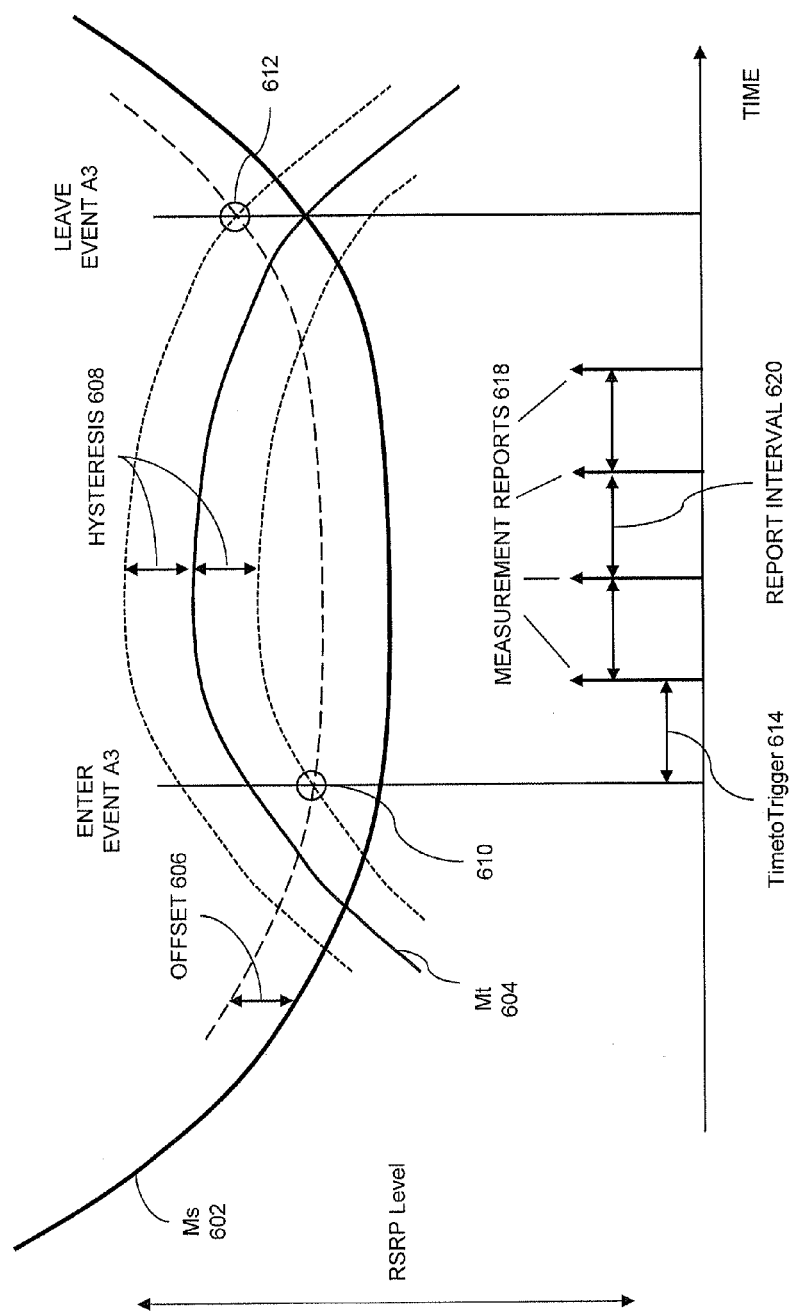
FIG. 6A is a graph of RSRP for a source station and a target station as a function of time, illustrating an example of an event for hand-over measurement reporting based on predetermined trigger parameters.

Referring to FIG. 6A, an example event A3 is shown, for source station signal strength (Ms 602) and target station signal strength (Mt 604). The event A3 is based on several predetermined hand-over parameters, including an offset parameter 606 (typically referred to as a3offset), a hysteresis parameter 608 (typically referred to as hysteresisa3) and a time to trigger parameter 614 (typically referred to as time-toTriggera3). The parameters 606, 608, 614 trigger hand-overs based on a strength of existing and potential radio connections and a time delay.

Offset parameter 606 is a value used to favorably bias the current Ms 602 of source station 17-1 compared to the current Mt 604 of target station 17-2. In general, offset parameter 606 may be used to manipulate and bias hand-over towards source station 17-1 or target station 17-2, on a system-wide basis or in special hand-over pair cases. Hysteresis parameter 608 may bias the Mt 604 of target station 17-2 such that the signal strength appears to be worse than actually measured. The biasing by hysteresis parameter 608 may be used to ensure that the signal strength Mt 604 of target station 17-2 really is stronger than the signal strength Ms 602 of source station 17-1, before UE 13-2 decides to send a measurement report to initiate hand-over. Hysteresis parameter 608 is a general hand-over "hurdle" used to isolate cells in hand-over initiation. Time to trigger parameter 614 is a time delay used to avoid a Ping-Pong effect for event triggering.

UE 13-2 uses offset parameter 606 and hysteresis parameter 608 to determine whether to trigger an event A3. In general, event A3 triggers when:

$$Mt - \text{Hysteresis} > Ms + \text{offset} \quad (1)$$

Event A3 onset point 610 illustrates the relationship shown in equation 1. At the onset of time to trigger 614 (provided that UE 13-2 does not receive a hand-over command from source station 17-1), UE 13-2 starts report interval timer 620, and sends measurement report 618 to source station 17-1. If the conditions (equation 1) are still met (and source station 17-1 has not responded), timer 620 is initiated again, and another measurement report 618 is sent to source station 17-1 at the expiration of timer 620. Measurement reports 618 are sent periodically while the event A3 condition (equation 1) is active.

UE 13-2 uses the same offset parameter 606 and hysteresis parameter 608 to determine when to leave event A3 (e.g., when source station 17-1 improves in signal quality relative to target station 17-2). UE 13-2 leaves event A3 when:

$$Mt + \text{Hysteresis} < Ms + \text{offset}. \quad (2)$$

Event A3 end point 612 illustrates the relationship shown in equation 2.

Referring to FIGS. 1 and 6A, currently, both offset 606 and hysteresis 608 are fixed values. Typically, a predetermined (fixed) offset value 606 and a high (fixed) hysteresis value 608 are applied to prevent traffic from handing over from cell 20-1 to cell 20-2. Offset value 606 and hysteresis value 608 are selected for capacity management purposes (i.e., to keep traffic from unloaded cell 20-1 away from busy cell 20-2). In relatively good radio frequency (RF) conditions (e.g., outdoor conditions), UEs 13 artificially biased to cell 20-1 in cell boundary 21 (e.g., UE 13-2) may easily sustain a substantial level of interference from cell 20-2 without dropping the call.

However, if the hand-over parameters (e.g., offset 606 and hysteresis 608) are tuned to good outdoor conditions, a large (fixed) hand-over hysteresis value 608 may cause difficult and problematic hand-overs for indoor conditions (i.e., where the RSRP coverage level is close to a minimal RSRP coverage required to sustain a call (e.g., about −120 dBm)). With a high hysteresis value 608, UEs 13 (such as UE 13-2) may sustain a considerable amount of interference in very poor coverage conditions before a hand-over to a better serving cell is triggered. For example, matched RSRP boundary outdoor levels may be about −85 dBm. With about 30 dB in-building loss, the same matched boundary level is about −115 dBm. If in-building penetration loss substantially reduces the RSRP level of both candidate cell 20-2 and serving cell 20-1, a large hysteresis value (e.g., about 4-6 dB) may push the RSRP hand-over trigger 610 of serving cell 20-1 close to the edge of functionality before the hand-over can be initiated. This situation may cause serious performance issues, such as slow throughput, choppy voice call audio and/or an excessive number of dropped connections.

Figure 6B:
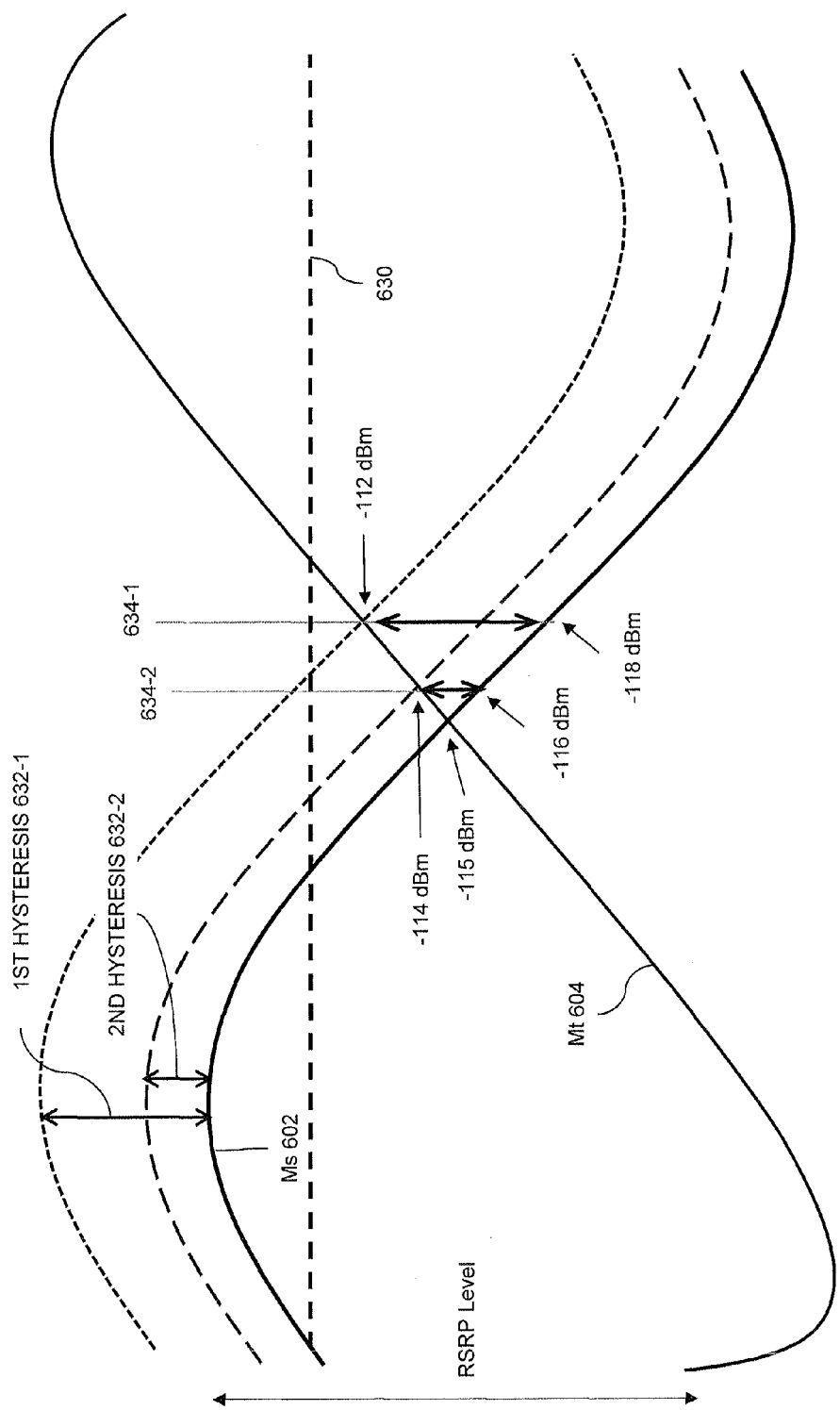
FIG. 6B is a graph of RSRP for a source station and a target station as a function of time, illustrating an example of the effect of hysteresis adjustment based on source station signal strength on the hand-over initiation point in an event.

Dynamic parameter controller 30 provides a dynamic (i.e., variable) parameter value (such as hysteresis value 608 and/or offset value 606) that considers the signal strength of source cell 20-1 as measured by a UE (such as UE 13-2). Referring to FIG. 6B, an example of hysteresis adjustment by controller 30 is shown. In particular, FIG. 6B illustrates source station signal strength Ms 602, target station signal strength Mt 604, first hysteresis values 632-1, second hysteresis value 632-2, first hand-over initiation point 634-1 (corresponding to first hysteresis value 632-1), second hand-over initiation point 634-2 (corresponding to second hysteresis value 632-2), and signal strength threshold 630. To simplify the discussion, in FIG. 6B, offset 606 (FIG. 6A) is not shown. Although offset 606 is not shown in FIG. 6B, it is understood that hand-over initiation point 610 (FIG. 6A) may also be a function of any offset value 606 (see equation 1). Although parameter adjustment is described in FIG. 6B with respect to hysteresis 632, it is also understood that offset 606 may be similarly adjusted. In other examples, both the offset 606 and hysteresis 632 may be adjusted based on the source station signal strength Ms 602 with respect to signal strength threshold 630.

In the example shown in FIG. 6B, controller 30 uses a dynamic hysteresis value (e.g., first hysteresis value 632-1 or second hysteresis value 632-2) to restrict frequent and capacity-consequential hand-overs in good (i.e., high) signal strength conditions (for capacity purposes), and to release hand-over prevention in poor (i.e., low) signal strength conditions (for performance purposes). For capacity purposes, controller 30 selects first (higher) hysteresis value 632-1 in good signal strength conditions (i.e., when MS 602 is greater than signal strength threshold 630). For performance purposes, controller 30 selects second (lower) hysteresis value 632-2 in poor signal strength conditions (i.e., when MS 602 is less than or equal to signal strength threshold 630).

For example, first hysteresis value 632-1 may be set to 6 dB, resulting in hand-over initiation point 634-1, when Ms 602 is −118 dBm and Mt 604 is −112 dBm. Second hysteresis value 632-2 may be set to 2 dB, resulting in hand-over initiation point 643-2, when Ms 602 is −116 dBm and Mt 604 is −114 dBm. Signal strength threshold 630 may be set to −100 dBm.

If Ms 602 (as measured by UE 13-2) is greater than signal strength threshold 630 (e.g., −100 dBm), controller 30 considers source cell 20-1 as having good (i.e., high) RF conditions, and selects first hysteresis value 632-1 (e.g., 6 dB) to initiate hand-over. If Ms 602 (as measured by UE 13-2) drops below signal strength threshold 630 (e.g., −100 dBm), controller 30 considers source cell 20-1 as having poor (i.e., low) RF conditions, and changes (i.e., reduces) first hysteresis value 632-1 (e.g., 6 dB) to second hysteresis value 632-2 (e.g., 2 dB). By changing first hysteresis value 632-1 (6 dB) to second hysteresis value 632-2 (2 dB), the hand-over difference between source cell 20-1 and target cell 20-2 is reduced in poor signal strength conditions.

FIG. 6B illustrates one example of dynamic parameter control by changing between two different hysteresis values 632-1, 632-2 based on one threshold 630. It is understood that controller 30 is not limited to a single threshold and two parameter values (e.g., two hysteresis values). In some examples, controller 30 may use two or more thresholds to select between two or more parameter values. An example of using two thresholds to select between two parameter values is described with respect to FIG. 5C.

Figure 3:
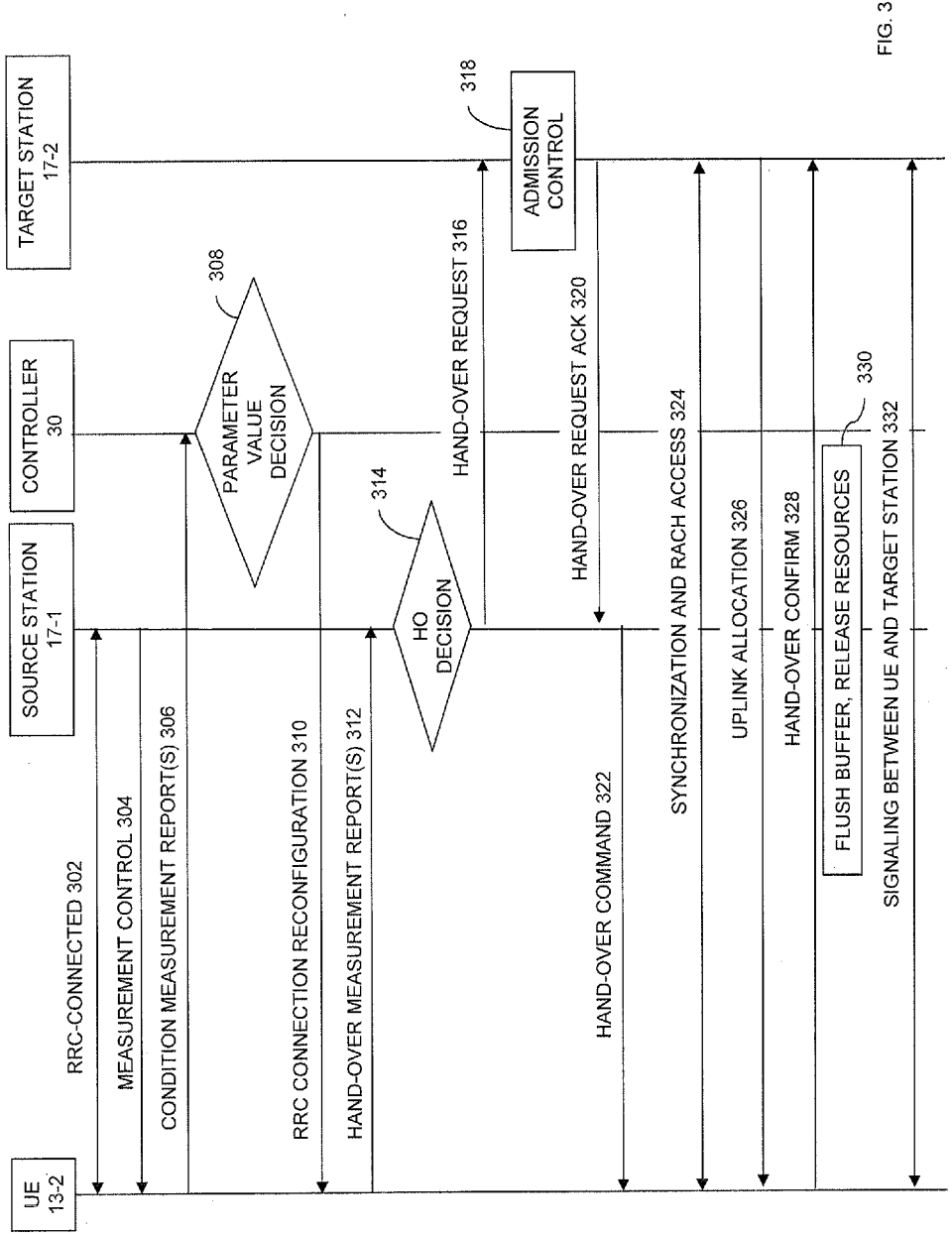
FIG. 3 is a signal flow diagram illustrating an example of hand-over processing with dynamic parameter adjustment.

FIG. 3 is a signal flow diagram illustrating an example of hand-over processing with dynamic parameter adjustment by dynamic parameter controller 30. In FIG. 3, the signal flow includes an interaction between UE 13-2, controller 30, source station 17-1 and target station 17-2. These applications were described in detail with respect to FIGS. 1, 2 and 7. Therefore, for the sake of brevity, they are not described here in more detail. As discussed above, controller 30 may be an internal component of source station 17-1 or may be an external component communicatively coupled to station 17-1. Although steps 306 and 312 are illustrated as being performed sequentially, it is understood that steps 306 and 312 may be performed in a different order than shown in FIG. 3, including being performed simultaneously.

The process for hand-over processing begins at step 302, with UE 13-2 and source station 17-1 being in an RRC-connected state (i.e., to permit communication of data between UE 13-2 and source station 17-1).

At step, 304, source station 17-1 sends RRC measurement control parameters (e.g., offset value 606, a hysteresis value (e.g., first hysteresis value 632-1 or second hysteresis value 632-2), TimetoTrigger 614, etc.) to UE 13-2. In one example, the measurement control parameters (step 304) sets an initial hysteresis value to first hysteresis value 632-1 (i.e., a higher hysteresis value). The measurement control parameters set thresholds for sending hand-over measurement reports (step 312) for initiating hand-over.

The measurement control parameters (step 304) may also set any parameters for performing condition measurement reports (step 306). For example, UE 13-2 may be instructed (in step 304 and/or in step 310) to send a predetermined number of condition measurement reports, to periodically send condition measurement reports at a predetermined report interval and/or to send condition measurement report(s) responsive to one or more trigger conditions (e.g., a predetermined change in the source signal strength Ms 602).

At step 306, UE 13-2 sends one or more condition measurement reports to controller 30. Each condition measurement report 306 indicates a signal strength (e.g., RSRP level) of source station 17-1, as measured by UE 13-2 from a strength of a reference signal sent from source station 17-1. In some examples, the condition measurement report may also indicate a signal strength of one or more target stations (such as target station 17-2). At step 308, responsive to the condition measurement report(s) (step 306), controller 30 determines whether to change the current parameter value to an alternate value. For example, controller 30 may determine to change the hysteresis value from first hysteresis value 632-1 to second hysteresis value 632-2 (or vice versa). In another example, controller 30 may determine to change the offset value to an alternate value. In another example, controller 30 may determine to change both the hysteresis value and the offset value to alternate values. Step 308 is described further below with respect to FIG. 4.

When controller 30 selects an alternate parameter value in step 308, controller 30 sends an RRC connection reconfiguration message, at step 310, to UE 13-2 via source station 17-1. The RRC connection reconfiguration message (step 310) includes instructions for UE 13-2 to send condition measurement report(s) (step 306) using the alternate parameter value selected by controller 30. In some examples, the RRC connection reconfiguration message may also include instructions regarding how many condition measurement reports to send, how often to send condition measurement report(s) and/or any trigger conditions for sending condition measurement report(s).

Although not shown in FIG. 3, controller 30, at step 308, may determine to maintain the current parameter value. When controller 30 determines to maintain the current parameter value, step 310 is not performed, and no RRC connection reconfiguration message is sent to UE 13-2. In some examples, steps 306-310 may be repeated multiple times, for example, when the signal strength of source station 17-1 fluctuates around signal strength threshold 630 (FIG. 6B) and no hand-over (HO) decision (step 314) occurs.

At step 312, UE 13-2 is triggered to send one or more hand-over measurement reports to source station 17-1, as described above with respect to FIG. 6A, based on the currently selected parameter value. At step 314, source station 17-1 determines whether to initiate a hand-over, based on the hand-over measurement report(s) received at step 312. Source station 17-1 may also consider other information to make a hand-over decision, such as load and/or service information of target station 17-2.

When source station 17-1 determines to initiate the hand-over (step 314), source station 17-1, at step 316, sends a hand-over request message to target station 17-2. At step 318, target station 17-2 performs admission control, responsive to the hand-over request message (step 316). During admission control, target station 17-2 performs a validation process to determine whether its current resources are sufficient for the proposed connection.

At step 320, target station 17-2 sends a hand-over request acknowledgement message to source station 17-2, responsive to the admission control (step 318). At 322, source station 17-1 sends a hand-over command to UE 13-2, responsive to the received hand-over request acknowledgement message (step 320). The hand-over command includes information for UE 13-2 to set up a connection to target station 17-2.

At step 324, UE 13-2 performs synchronization to target station 17-2 and accesses target station 17-2 via a resources access channel (RACH) procedure. At step 326, target station 17-2 sends uplink allocation and timing adjustment information to UE 13-2, responsive to the synchronization and RACH access in step 324.

At step 328, a hand-over confirm message is sent from UE 13-2 to target station 17-2, responsive to the uplink allocation (in step 326). At step 330, source station 17-1 flushes its buffer and releases its resources relating to UE 13-2. In some examples, UE 13-2 may be placed in an RRC idle state after source station 17-1 sends the hand-over command (step 322) to UE 13-2.

At step 332, signaling between UE 13-2 and target station 17-2 commences, and UE 13-2 is no longer connected to source station 17-1.

Figure 4:
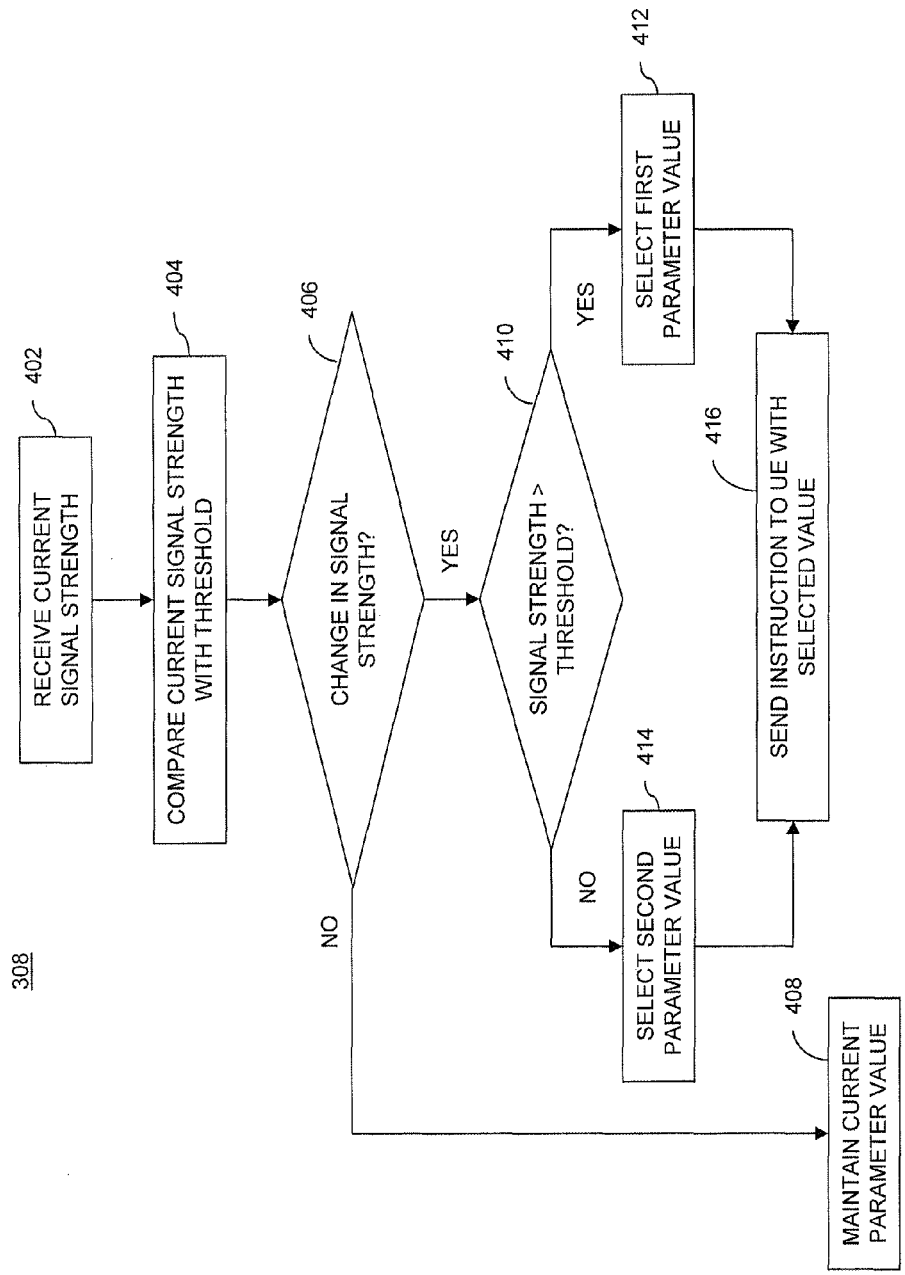
FIG. 4 is a flow chart diagram illustrating an example of dynamic parameter control based on source station signal strength information.

FIG. 4 is a flow chart diagram illustrating an example of dynamic parameter control (step 308 in FIG. 3) by controller 30, based on signal strength information of source station 17-1. At step 402, the current signal strength indication of source station 17-1 is received from UE 13-2, for example, in one or more condition measurement reports (step 306) via transceivers 202 (FIG. 2) of source station 17-1. The condition measurement report(s) may be sent from station 17-1 to signal strength comparator 212 (FIG. 2) of dynamic parameter controller 30. The condition measurement report(s) indicate the current strength of a received reference signal from source station 17-1 as measured by UE 13-2.

At step 404, the received current signal strength indication of source station 17-1 is compared with a signal strength threshold 630 (FIG. 6B), for example, by signal strength comparator 212 (FIG. 2), to identify whether there is a change in the strength of the reference signal received by UE 13-2 from source station 17-1 (i.e., significant enough to change the currently selected parameter value, such as hysteresis value 632). In one example, comparator 212 compares the current signal strength indication and a previously received signal strength indication with threshold 630 (stored in database 216) to identify a change in the reference signal strength. In another example, comparator 212 compares the current signal strength to threshold 630, and determines whether or not the comparison corresponds to the currently selected parameter value. The change in signal condition may represents a change from a high RF condition to a low RF condition (i.e., where the signal strength drops below threshold 630) or from a low RF condition to a high RF condition (i.e., where the signal strength increases above threshold 630).

At step 406, it is determined whether there is a change in the signal strength condition, for example, by signal strength comparator 212 (FIG. 2). When signal strength comparator 212 determines, at step 406, that there is no change in the signal strength, step 406 proceeds to step 408. At step 408, the current parameter value is maintained (and no instruction is sent to UE 13-2).

When it is determined (e.g., by signal strength comparator 212), at step 406, that the signal strength is changed, step 406 proceeds to step 410. At step 410, it is determined (e.g., by parameter value selector 214) whether the current signal strength indication is greater than signal strength threshold 630.

When it is determined, at step 410, that the signal strength indication is greater than predetermined threshold 630, step 410 proceeds to step 412, and parameter value selector 214 selects a first (higher) parameter value (e.g., hysteresis value 632-1 shown in FIG. 6B). When it is determined, at step 410, that the signal strength indication is less than or equal to predetermined threshold 630, step 410 proceeds to step 414, and parameter value selector 214 selects a second (lower) parameter value (e.g., hysteresis value 632-2 shown in FIG. 6B).

At step 416, an instruction is sent to UE 13-2 with the selected (alternate) parameter value, as determined by parameter value selector 214 in step 412 or step 414. For example, controller 30 (FIG. 2) may instruct processing system 204 to send the instruction to UE 13-2. Processing system 204 may send the instruction (including the selected parameter value) to UE 13-2 in an RRC connection reconfiguration message (step 310 in FIG. 3) via transceiver 202.

FIG. 5A is a flow chart diagram illustrating an example of condition measurement report transmission and parameter value storage, at a UE such as UE 13-2. At step 500, UE 13-2 measures the current strength of a reference signal received from source station 17-1. At step 502, UE 13-2 sends an indication of the measured signal strength (such as an RSRP level or an RSRQ level) in a condition measurement report (e.g., step 306 of FIG. 3) to source station 17-1.

In one example, UE 13-2 sends a condition measurement report responsive to a trigger condition. For example, UE 13-2 compares the currently measured reference signal strength (or a change in reference signal strength) to a predetermined trigger condition. The trigger condition may include a trigger threshold having a same value or a different value from signal strength threshold 630 (FIG. 6B). The trigger condition may also include two or more different thresholds for sending a condition report to source station 17-1. In one example, if the reference signal strength (or change in reference signal strength) is less than the trigger condition, a condition measurement report is sent to source station 17-1. In another example, if the reference signal strength (or change in reference signal strength) is greater than the trigger condition, a condition measurement report is sent to source station 17-1. In another example, if the reference signal strength (or change in reference signal strength) is between a first threshold and a second threshold, a condition measurement report is sent to source station 17-1.

At optional step 504, UE 13-2 periodically repeats steps 500-502 at a predetermined report interval. Any instructions regarding a number of reference signal strength measurements to obtain, a predetermined report interval between signal strength measurements and/or trigger condition(s) for generating and sending condition measurement reports may be received in a measurement control message (step 304 in FIG. 3) and/or an RRC connection reconfiguration message step 310) from source station 17-1.

At step 506, UE 13-2 receives an RRC connection reconfiguration message including an instruction to use the selected (alternate) parameter value in the instruction for hand-over measurement reporting (step 312 in FIG. 3). At step 508, the selected parameter value in the RRC connection reconfiguration message is stored at UE 13-2. Steps 500-508 may be repeated until a hand-over decision is reached (step 314), for example, if the signal strength Ms 602 of source station 17-1 fluctuates around signal strength threshold 630.

FIG. 5B is a flow chart diagram illustrating an additional example of dynamic parameter control that may be performed by controller 30. At step 510, UE 13-2 measures the current reference signal strength of source station 17-1. At step 512, UE 13-2 sends an indication of the measured reference signal strength in a condition measurement report (e.g., step 306 of FIG. 3) to source station 17-1, responsive to a trigger condition(s).

At step 514, controller 30 performs steps 404-406 (FIG. 4), responsive to the condition measurement report of step 512. At step 516, controller 30, via source station 17-1, sends an instruction to UE 13-2 to perform a set of signal strength measurements when controller 30 determines that there is a change in the signal strength (in step 406 of FIG. 4). Source station 17-1 may send the instruction to UE 13-2 in an RRC connection reconfiguration message. At step 518, controller 30 (via source station 17-1) receives a set of measurements from UE 13-2, responsive to the instruction (step 516). UE 13-2 may send the set of signal strength measurements to controller 30 (via source station 17-1) in one or more condition measurement reports.

At step 520, controller 30 determines whether there is a change in the signal strength of source station 17-1, based on the set of signal strength measurements received from UE 13-2.

When it is determined, by controller 30 at step 520, that the signal strength is changed, step 520 proceeds to step 522. At step 522, controller 30 performs steps 410-416 (FIG. 4), to select an alternate parameter value.

When it is determined, by controller 30 at step 520, that the signal strength is not changed, step 520 proceeds to step 524. At step 524, controller 30 performs step 408 (FIG. 4), to maintain the current parameter value.

By using the trigger condition(s) (step 512) and the set of measurements (steps 516-520), a variability of the parameter value (e.g., between first hysteresis value 632-1 and second hysteresis value 632-2) may be reduced for conditions where the signal strength fluctuates around signal strength threshold 630. The example method may also reduce alteration of the parameter value for errant signal strength values that may trigger a condition measurement report (step 512).

Figure 5C:
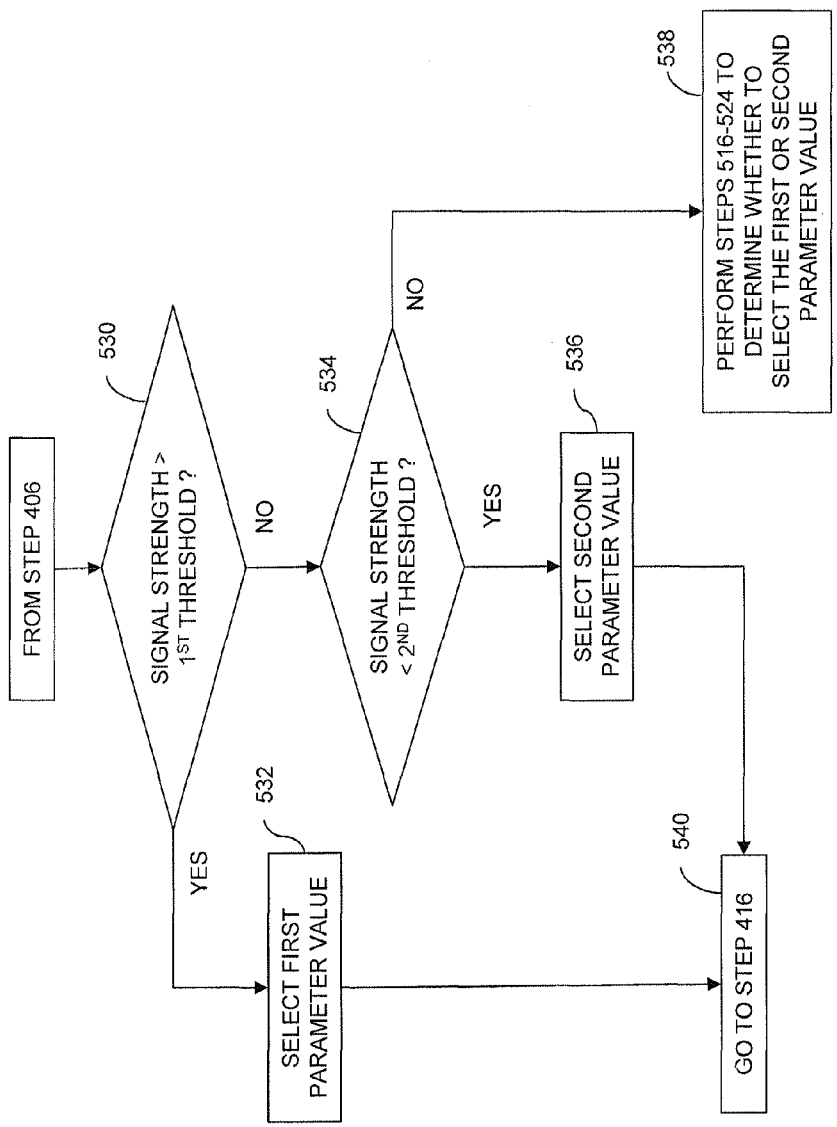
FIG. 5C is a flow chart diagram illustrating an example of dynamic parameter control based on two signal strength thresholds.

FIG. 5C is a flow chart diagram illustrating an example of dynamic parameter control based on two signal strength thresholds that may be performed by controller 30. In FIG. 5C, it is assumed that steps 402-406 (FIG. 4) have been performed. At step 530, controller 30 compares the signal strength to a first threshold (when it is determined in step 406 that the signal strength has changed).

When controller 30 determines that the signal strength is greater than the first threshold, step 530 proceeds to step 532. At step 532, controller 30 selects the first (higher) parameter value (e.g., hysteresis value 632-1). Step 532 proceeds to step 540. At step 540, controller 30 performs step 416, sending an instruction to UE 13-2 to use the selected parameter value for hand-over measurement reporting.

When controller 30 determines that the signal strength is less than or equal to the first threshold, step 530 proceeds to step 534. At step 534, controller 30 compares the signal strength to a second threshold that is less than the first threshold.

When controller 30 determines that the signal strength is less than the second threshold, step 534 proceeds to step 536. At step 536, controller 30 selects second (lower) parameter value (e.g., hysteresis value 632-2). Step 536 proceeds to step 540, and controller 30 performs step 416.

When controller 30 determines, at step 534, that the signal strength is greater than or equal to the second threshold (and less than or equal to the first signal strength), step 534 proceeds to step 538. At step 538, controller 30 performs steps 516-524, to determine whether to change the parameter value.

Although FIG. 5C illustrates two thresholds, it is understood that more than two thresholds may be used to select between parameter values. Although FIG. 5C illustrates selecting between two parameter values, controller 30 may select between two or more parameter values. For example, in FIG. 5C, step 538 may be used to select a third parameter value between the first and second parameter values (as opposed to performing additional measurements).

Figure 7:
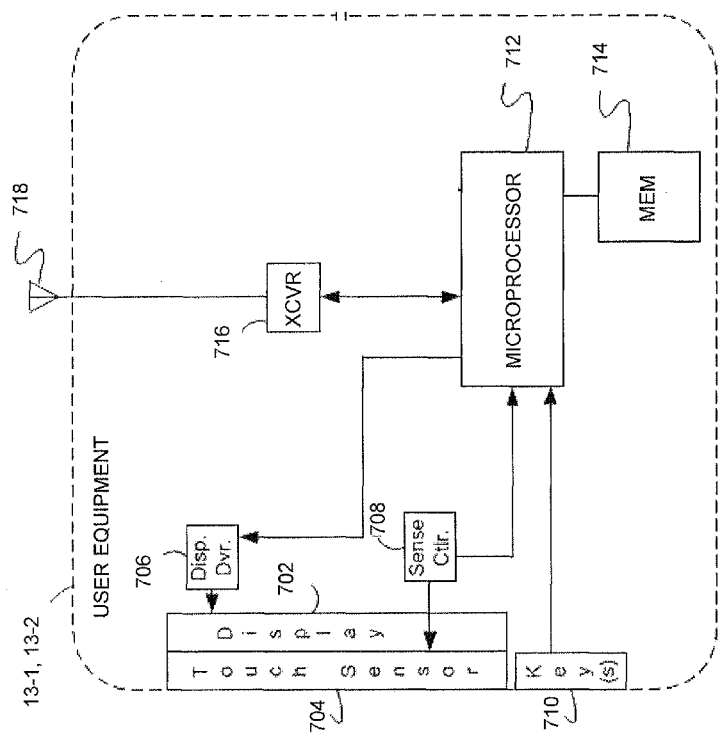
FIG. 7 is a high-level functional block diagram of an example user equipment, as may be involved in generating signal strength condition measurement reports and hand-over measurement reports.

FIG. 7 is a block diagram of an example UE 13 (e.g., 13-1 or 13-2). In general, UE 13-1, 13-2 may be implemented as any portable computing device capable of generating condition measurement reports (for parameter adjustment), as well as hand-over measurement reports (for initiation of hand-over).

The example UE 13 shown in FIG. 7 includes display 702 and touch sensor 704 controlled by display driver 706 and sense control circuit 708 respectively. UE 13 may also include keys 710 that provide additional input. Of course other user interface hardware components may be used in place of or instead of the display, touch sensor and keys, depending on the expected types of data applications used by UE 13.

The UE 13 includes one or more processor circuits implementing a CPU functionality for data processing and operational control of UE 13, including for operations involved in the condition measurement reports under consideration here (such as the functions shown in FIGS. 3, 5A and 5B). Although a microcontroller or other type of processor circuit may be used, in the example, the CPU processor of UE 13 takes the form of a microprocessor 712.

Programs and data for microprocessor 712 are stored in memory 714. Memory 714 may include flash type program memory for storage of various "software" or "firmware" program routines and configuration settings, such as mobile directory number (MDN), an international mobile subscriber identity (IMSI) and/or a mobile identification number (MIN), etc. The UE 13 may also include a non-volatile random access memory for a working data processing memory. Of course, other storage devices or configurations may be added to or substituted for those in the example. In some examples, memory 714 may include both random access memory and flash memory.

The UE 13 includes transceiver (XCVR) 716 coupled to antenna 718, for digital wireless communications. The concepts discussed here encompass embodiments of UE 13 utilizing any digital transceivers that conform to current or future developed digital wireless communication standards. The UE 13 may also be capable of analog operation via a legacy network technology. Transceiver 716 provides two-way wireless communication of information, in accordance with the technology of the network 10. Transceiver 716 also sends and receives a variety of signaling messages in support of the various data services provided via UE 13 and the communication network 15.

Keys 710, display driver 706, sense control circuit 708, transceiver 716 and memory 714 are all coupled to microprocessor 712. Operation of UE 13 is controlled by microprocessor 712 execution of programming from memory 714.

As shown by the above discussion, functions relating to the dynamic parameter control service may be implemented on computers connected for data communication via the components of a packet data network, operating as various servers and/or user terminals, as shown in FIG. 1. Although special purpose devices may be used for servers operating as a dynamic parameter controller, such devices also may be implemented using one or more hardware platforms intended to represent a general class of data processing device commonly used to run "server" programming so as to implement the dynamic parameter control functions discussed above, albeit with an appropriate network connection for data communication. UEs such as 13-1 and 13-2 similarly may be implemented on general purpose computers, albeit with appropriate user interface elements and programming.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g., files used for the dynamic parameter control service. For each of the various server platforms, the software code is executable by the general-purpose computer that functions as a server and/or that functions as a terminal device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for the dynamic parameter control service, in essentially the manner performed in the implementations discussed and illustrated herein.

FIGS. 8 and 9 provide functional block diagram illustrations of general purpose computer hardware platforms. FIG. 8 illustrates a network or host computer platform, as may typically be used to implement a server, including the dynamic parameter controller 30. FIG. 9 depicts a computer with user interface elements, as may be used to implement a personal computer or other type of work station or terminal device, although the computer of FIG. 9 may also act as a server if appropriately programmed. It is believed that the general structure and general operation of such equipment as shown in FIGS. 8 and 9 should be self-explanatory from the high-level illustrations.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 9). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, aspects of the dynamic parameter control service outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms. Non-volatile storage media include, for example, optical or magnetic disks, such as any of the storage devices in any computer(s) or the like, such as may be used to implement the aspects shown in the drawings. Volatile storage media include dynamic memory, such as main memory of such a computer platform. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge. Many of these forms of non-transitory computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

APPENDIX

Acronym List

The description above has a large number of acronyms to refer to various devices, messages and system components. Although generally known, use of several of these acronyms is not strictly standardized in the art. For the convenience of the reader, the following list correlates terms to acronyms, as used by way of example in the detailed description above.

ASIC—Application Specific Circuit
CD-ROM—Compact Disk Read Only Memory
CPU—Central Processing Unit
DVD—Digital Video Disk
DVD-ROM—Digital Video Disk Read Only Memory
eNB, eNodeB—Evolved Node B
EPC—Evolved Packet Core
EEPROM—Electrically Erasable Programmable Read Only Memory
EPROM—Erasable Programmable Read Only Memory
FEC—Forward Error Correction
FLASH-EPROM—Flash Erasable Programmable Read Only Memory
FPGA—Field Programmable Gate Array
HO—Hand-over
IMSI—International Mobile Subscriber Identity
IP—Internet Protocol
LTE—Long Term Evolution
MDN—Mobile Directory Number
MIN—Mobile Identification Number
MME—Mobility Management Entity
PC—Personal Computer
PDA—Personal Digital Assistant
PDN—Packet Data Network
PROM—Programmable Read Only Memory
PSTN—Public Switched Telephone Network
QPSK—Quadrature Phase Shift Keying
RACH—Resources Access Channel
RAM—Random Access Memory
RF—Radio Frequency
ROM—Read Only Memory
RRC—Radio Resource Control
RSRP—Reference Signal Receive Power
RSRQ—Reference Signal Receive Quality
SGW—Serving Gateway
UE—User Equipment
WCDMA—Wideband Code Division Multiple Access
3GPP—3$^{rd}$ Generation Partnership Project

What is claimed is:

1. A method comprising:
   receiving, by a station in a wireless communication network, a condition measurement report from a user equipment (UE) served by the station,
      the wireless communication network including a Long Term Evolution (LTE) network,
      the condition measurement report including signal strength information indicating a signal strength of the station for the UE,
         the signal strength information comprising information indicating a strength of a reference signal measured by the UE,
            the reference signal being received by the UE from the station;
   comparing, by the station, the signal strength information to a signal strength threshold in order to identify a change in the strength of the reference signal received from the station by the UE;
   selecting, by the station, an alternate parameter value for a parameter associated with a hand-over of the UE, based on the change in the strength of the reference signal,
      the alternate parameter value being different than a current parameter value being utilized by the UE for the parameter associated with the hand-over of the UE; and
   sending, by the station and to the UE, an instruction instructing the UE to perform hand-over measurement reporting based on the alternate parameter value.

2. The method of claim 1, wherein the signal strength information includes at least one of a reference signal receive power (RSRP) level or a reference signal receive quality (RSRQ) level.

3. The method of claim 1, wherein the parameter associated with hand-over includes at least one of a hysteresis or an offset.

4. The method of claim 1, wherein the selecting of the alternate parameter value for the parameter associated with the hand-over includes selecting a first parameter value when the signal strength information is greater than the signal strength threshold and selecting a second parameter value when the signal strength information is less than or equal to the signal strength threshold, the second parameter value being less than the first parameter value.

5. The method of claim 4, wherein the first parameter value is selected to reduce a hand-over likelihood in radio frequency (RF) conditions of the station higher than the signal strength threshold and the second parameter value is selected to increase the hand-over likelihood in RF conditions of the station lower than the signal strength threshold.

6. The method of claim 1, wherein the condition measurement report includes a plurality of condition measurement reports and the method includes comparing the signal strength information from each of the plurality of condition measurement reports to the signal strength threshold, to identify the change in the strength of the reference signal received from the station.

7. The method of claim 1, wherein the receiving of the condition measurement report includes receiving the condition measurement report responsive to a predetermined trigger condition associated with a current strength of the reference signal measured by the UE.

8. The method of claim 1, wherein the signal strength threshold includes a plurality of signal strength thresholds and the method includes selecting the alternate parameter value by comparing the signal strength information to the plurality of signal strength thresholds.

9. The method of claim 1, the method further comprising sending a further instruction from the station to the UE served by the station, the further instruction including at least one of a predetermined trigger condition for sending the condition measurement report to the station, an indication of a number of condition measurement reports to generate by the UE or a predetermined report interval between each condition measurement report.

10. The method of claim 1, the method further comprising, after the sending of the instruction:
repeating the steps of receiving the condition measurement report, comparing the signal strength information, selecting the alternate parameter value, and sending the instruction.

11. A system comprising:
a station in a wireless communication network serving a user equipment (UE), the wireless communication network including a Long Term Evolution (LTE) network;
a database storing at least one signal strength threshold; and
a parameter controller communicatively coupled to the station, the parameter controller configured to:
receive, via the station, a condition measurement report from the UE served by the station, the condition measurement report including a signal strength information indicating a signal strength of the station for the UE,
the signal strength information comprising information indicating a strength of a reference signal measured by the UE,
the reference signal being received by the UE from the station;
compare the signal strength information to the at least one signal strength threshold stored in the database in order to identify a change in the strength of the reference signal received from the station by the UE; and
select an alternate parameter value for a parameter associated with a hand-over of the UE, based on the change in the strength of the reference signal,
the alternate parameter value being different than a current parameter value being utilized by the UE for the parameter associated with the hand-over of the UE,
wherein the station sends an instruction to the UE to perform hand-over measurement reporting based on the alternate parameter value.

12. The system of claim 11, wherein the parameter controller is configured to select a first parameter value as the alternate parameter value for the parameter associated with the hand-over when the signal strength information is greater than the at least one signal strength threshold and select a second parameter value as the alternate parameter value for the parameter associated with the hand-over when the signal strength information is less than or equal to the at least one signal strength threshold, the second parameter value being less than the first parameter value.

13. The system of claim 11, wherein the station is configured to send a further instruction to the UE served by the station, the further instruction including at least one of a predetermined trigger condition for sending the condition measurement report to the station, an indication of a number of condition measurement reports to generate by the UE or a predetermined report interval between each condition measurement report.

14. The system of claim 11, wherein the station is configured to receive the condition measurement report responsive to a predetermined trigger condition associated with a current strength of the reference signal measured by the UE.

15. The system of claim 11, wherein the condition measurement report includes a plurality of condition measurement reports and the parameter controller is configured to compare the signal strength information from each of the plurality of condition measurement reports to the at least one signal strength threshold, to identify the change in the strength of the reference signal received from the station by the UE.

16. The system of claim 11, wherein the at least one signal strength threshold includes a plurality of signal strength thresholds and the parameter controller is configured to select the alternate parameter value by comparing the signal strength information to the plurality of signal strength thresholds.

17. A non-transitory computer readable medium for storing instructions, the instructions comprising:
one or more instructions that, when executed by one or more network devices in a wireless communication network, cause the one or more network devices to:
receive, via a network device in the wireless communication network, at least one condition measurement report from a user equipment (UE) served by the network device,
the wireless communication network including a Long-Term Evolution (LTE) network,
the at least one condition measurement report including signal strength information indicating a signal strength of the network device for the UE,
the signal strength information comprising information indicating a strength of a reference signal measured by the UE,
the reference signal being received by the UE from the network device;
compare the signal strength information in the at least one condition measurement report to at least one signal strength threshold in order to identify a change in the strength of the reference signal received from the network device by the UE;
select an alternate parameter value for a parameter associated with a hand-over of the UE, based on the change in the strength of the reference signal,
the alternate parameter value being different than a current parameter value being utilized by the UE for the parameter associated with the hand-over of the UE; and
send an instruction to the UE served by the network device to perform hand-over measurement reporting based on the alternate parameter value.

18. The non-transitory computer readable medium of claim 17, wherein the instructions further comprise:
one or more instructions that, when executed by the one or more network devices, cause the one or more network devices to:

select a first parameter value as the alternate parameter value for the parameter associated with the hand-over when the signal strength information is greater than the at least one signal strength threshold; and select a second parameter value as the alternate parameter value for the parameter associated with the hand-over when the signal strength information is less than or equal to the at least one signal strength threshold, the second parameter value being less than the first parameter value.

19. The non-transitory computer readable medium of claim 17, wherein the at least one signal strength threshold includes a plurality of signal strength thresholds and the instructions further comprise:

one or more instructions that, when executed by the one or more network devices, cause the one or more network devices to:

select the alternate parameter value for the parameter associated with the hand-over from among two or more predetermined parameter values by comparing the signal strength information to the plurality of signal strength thresholds.

20. The non-transitory computer readable medium of claim 17, wherein the instructions further comprise:

one or more instructions that, when executed by the one or more network devices, cause the one or more network devices to:

send a further instruction to the UE served by the network device, the further instruction including at least one of a predetermined trigger condition for sending the at least one condition measurement report to the network device, an indication of a number of condition measurement reports to generate by the UE or a predetermined report interval between each condition measurement report.

* * * * *